United States Patent [19]

Vengsarkar

[11] Patent Number: 5,473,714
[45] Date of Patent: Dec. 5, 1995

[54] OPTICAL FIBER SYSTEM USING TAPERED FIBER DEVICES

[75] Inventor: Ashish M. Vengsarkar, Chatham, N.J.

[73] Assignee: AT&T Corp., Murray Hill, N.Y.

[21] Appl. No.: 235,575

[22] Filed: Apr. 29, 1994

[51] Int. Cl.[6] .................................................. G02B 6/34
[52] U.S. Cl. ............................ 385/43; 385/29; 385/37; 385/123; 385/126
[58] Field of Search ............................ 385/43, 16, 24, 385/27, 28, 37, 48, 123, 126, 143, 29

[56] References Cited

U.S. PATENT DOCUMENTS

| | | | |
|---|---|---|---|
| 4,761,073 | 8/1988 | Meltz et al. | 356/32 |
| 4,784,466 | 11/1988 | Khoe et al. | 385/43 X |
| 4,889,404 | 12/1989 | Bhagavatula et al. | 385/24 |
| 4,946,250 | 8/1990 | Gonthier et al. | 385/27 |
| 4,950,883 | 8/1990 | Glenn | 250/227 |
| 5,170,451 | 12/1992 | Ohshima | 385/43 |
| 5,295,211 | 3/1994 | Weidman | 385/43 |

OTHER PUBLICATIONS

M. Monerie, "Propagation in Doubly Clad Single–Mode Fibers", *IEEE Journal of Quantum Electronics*, vol. QE–18, No. 4 pp. 535–542 (1982) No Month.

S. Kawakami, et al. "Characteristics of a Doubly Clad Optical Fiber with a Low–Index Inner Cladding", *IEEE Journal of Quantum Electronics* vol. QE–10, No. 12 pp. 879–887 (1974) No Month.

*Primary Examiner*—John D. Lee
*Assistant Examiner*—Phan T. H. Palmer
*Attorney, Agent, or Firm*—Glen E. Books

[57] ABSTRACT

In accordance with the invention, an optical fiber system is provided with a tapered fiber device for filtering, wavelength shift detecting, or switching. Specifically, applicant has discovered that a multiclad single mode optical fiber with a fundamental mode cutoff can be tapered to form a compact component useful in optical fiber systems, e.g. a filter in telecommunications systems, a wavelength shift detector in sensing systems, or a switch in any optical system.

10 Claims, 2 Drawing Sheets

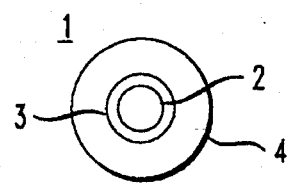
FIG. 1
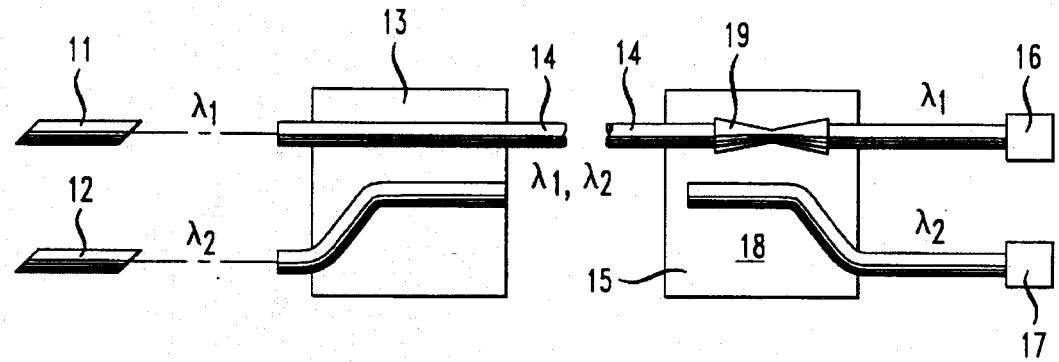
FIG. 2
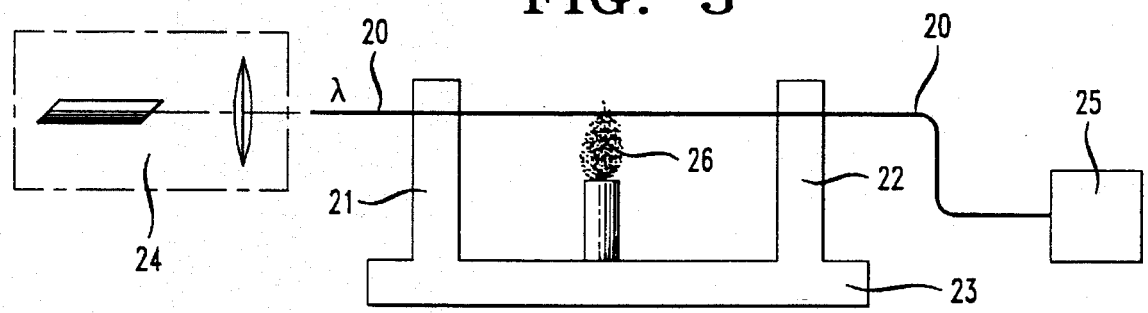
FIG. 3
FIG. 4
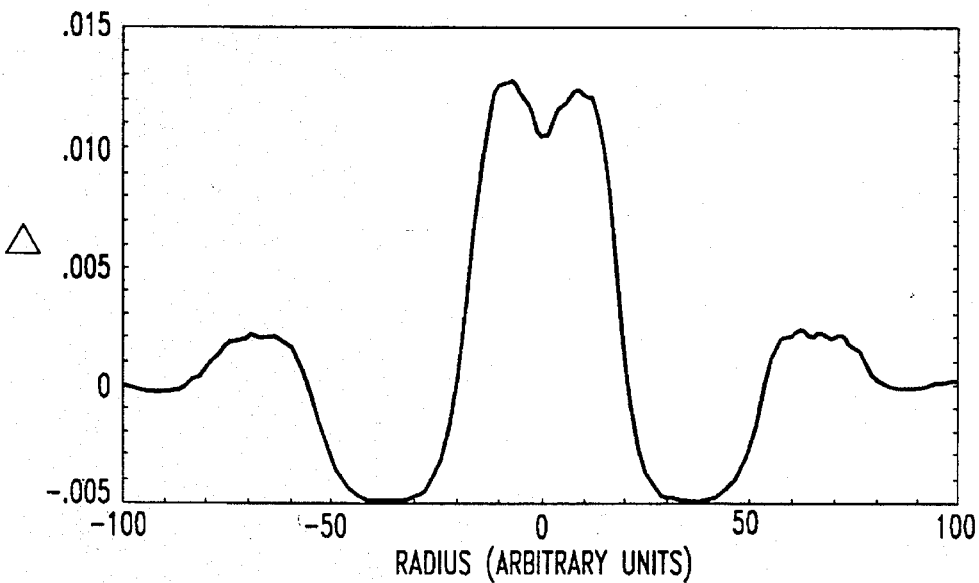

OPTICAL FIBER SYSTEM USING TAPERED FIBER DEVICES

FIELD OF THE INVENTION

This invention relates to optical fiber systems, such as fiber communications and fiber sensing systems, and, in particular, to optical fiber systems provided with a tapered fiber device for filtering, wavelength shift detecting, or switching.

BACKGROUND OF THE INVENTION

Optical fibers are key components in modern telecommunications systems and in recently developed remote sensing systems. Optical fibers are thin strands of glass capable of transmitting an optical signal over long distances with very low loss. In essence an optical fiber is a small diameter waveguide characterized by a core with a first index of refraction surrounded by one or more regions of cladding having lower indices of refraction. Light rays which impinge upon the core at an angle less than a critical acceptance angle undergo total internal reflection within the fiber core. These rays are guided along the axis of the fiber with minimum attenuation. Typical optical fibers are made of high purity silica with minor concentrations of dopants to control the index of refraction.

A typical optical fiber communications system comprises a source of optical input signals, a length of optical fiber coupled to the source and a receiver for optical signals coupled to the fiber. One or more amplifying devices are disposed along the fiber for amplifying the transmitted signal. Current systems use single wavelength digitally modulated optical signals. Contemplated systems would use a plurality of wavelengths in multichannel wavelength division multiplexed (WDM) systems. Optical filtering devices are useful components in optical fiber communications systems and especially in WDM systems.

There are a wide variety of sensing systems using optical fibers as sensing elements. See, for example, U.S. Pat. No. 4,761,073 issued to Meltz et al. on Aug. 2, 1988 which is incorporated herein by reference and U.S. Pat. No. 4,950,883 issued to W. Glenn on Aug. 21, 1990 which is also incorporated herein by reference. Such a system uses an optical fiber which includes along its length one or more photoinduced periodic gratings. In response to light transmitted along the fiber, each grating acts as a partial reflecting mirror for light of a narrow band of wavelengths corresponding to twice the periodicity of the grating. Stress or temperature change applied to the fiber in the grating region changes the effective periodicity of the grating and thereby shifts the wavelength of the light which is reflected by the grating. Thus spectral analysis of the reflected light provides information concerning conditions at the location of the gratings. Accordingly, wavelength shift detectors are useful components in optical fiber sensing systems.

SUMMARY OF THE INVENTION

In accordance with the invention, an optical fiber system is provided with a tapered fiber device for filtering, wavelength shift detecting, or switching. Specifically, applicant has discovered that a multiclad single mode optical fiber with a fundamental mode cutoff can be tapered to form a compact component useful in optical fiber systems, e.g. a filter in telecommunications systems, a wavelength shift detector in sensing systems, or a switch in any optical system.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIG. 1 is a cross section of a typical tapered fiber device;

FIG. 2 shows an optical fiber telecommunications systems using a tapered fiber device as a filter;

FIG. 3 illustrates the preferred method for making a tapered fiber device;

FIGS. 4, 5 and 6 are graphs illustrating features of a specific example of a tapered fiber device.

Figure 5:
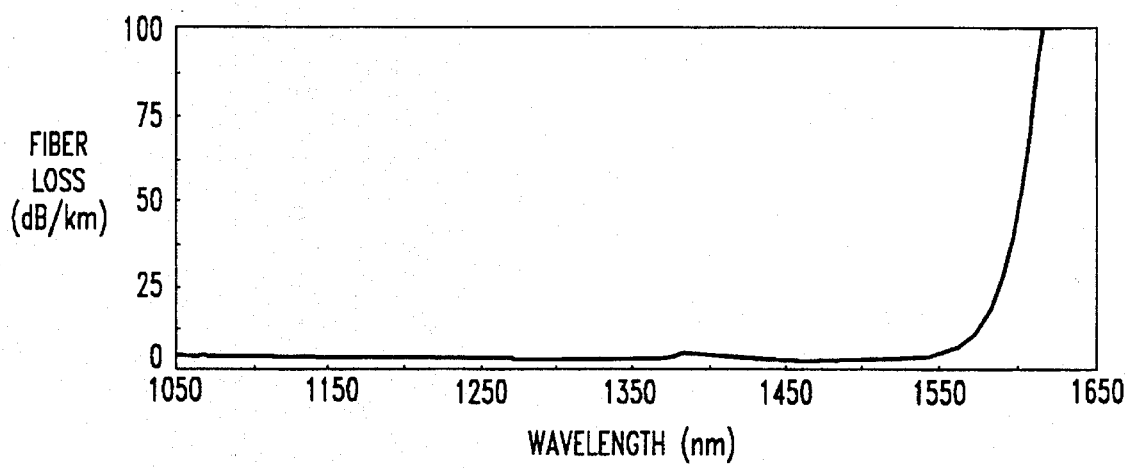

It is to be understood that these drawings are for purposes of illustrating the concepts of the invention and, except for graphical illustrations, are not to scale.

DETAILED DESCRIPTION

Referring to the drawings, FIG. 1 is a cross section of a typical tapered fiber device which is essentially a multiclad single mode optical fiber 1 comprising an inner core 2 having a relatively high index of refraction surrounded by a plurality of cladding layers 3 and 4, having relatively lower indices of refraction as compared to the core. Conveniently, the fibers are drawn with a circular core 2 and concentric cladding layers 3, 4 in accordance with processes well known in the art. The core is typically germanium-doped silica, and the cladding layers are typically silica or fluorine-doped silica. In accordance with principles well known in the art, the fiber is dimensioned for single mode operation. The core dimensions are typically a few microns or less, and cladding layers are typically a few microns to several tens of microns. Not shown in FIG. 1 is the fact that this fiber has been tapered as by heating it and stretching it along its longitudinal axis.

Multiclad single mode optical fibers leak light of wavelength above a characteristic cutoff wavelength. Thus in substantial lengths on the order of kilometers or in shorter spooled lengths on the order of hundreds of meters, such fiber will exhibit a typical cutoff spectral response. However, the loss mechanism is gradual, and in short lengths the cutoff loss is normally negligible. Applicant has discovered that by tapering these fibers, one can make a compact device exhibiting cutoff characteristics in short lengths of less than 1 meter and preferably on the order of a few centimeters. Moreover, the effective cutoff wavelength and loss slope can be tailored to the needs of an optical system. This is illustrated by providing filters, shift detectors and switches for optical systems.

FIG. 2 schematically illustrates an optical fiber telecommunications system 10 using a tapered fiber device as a filter. In essence, the system comprises a plurality of sources 11, 12 of optical signals at a respective plurality of wavelengths $\lambda_1, \lambda_2$ ($\lambda_2 > \lambda_1$), a wavelength division multiplexer 13 for combining the optical signals, a length of optical transmission fiber 14, and a WDM demultiplexer 15 for separating the $\lambda_1$ and $\lambda_2$ signals, and a plurality of detectors 16, 17 for demodulating the respective signals.

The demultiplexer 15 comprises a wavelength dependent coupler 18 for coupling the $\lambda_2$ signal off fiber 14 and a tapered fiber device 19 for filtering any remaining $\lambda_2$ signal from the $\lambda_1$ branch. More specifically, tapered fiber device 19 is a multiclad single mode optical fiber with a fundamental mode cutoff near $\lambda_2$ (within ±500 nm of $\lambda_2$ and preferably within ±150 nm). It is tapered to a minimum dimension such that $\lambda_2$ is in the cutoff region while $\lambda_1$ is not. So the $\lambda_2$ signal is attenuated at least 3 dB while the $\lambda_1$ signal passes with almost no loss.

FIG. 3 illustrates the currently preferred way of making tapered waveguide device 19. In essence, a length of multiclad fiber 20 having a fundamental mode cutoff near $\lambda_2$ is placed on mounts 21, 22 in a coupler station 23 between a source 24 of broadband light around $\lambda_2$ and a spectrum analyzer 25. The fiber is locally heated, as by an oxypropane torch flame 26 (T>1000° C.), to the softening point and tapered by stretching while the intensity spectrum from analyzer 25 is monitored. When the spectrum displays the desired loss at $\lambda_2$, the stretching is discontinued and the heat is removed. The device 14 has been formed.

It should be noted that the fundamental mode cutoff wavelength before tapering can be several hundred nanometers away from $\lambda_2$, and the fiber can still be tapered for this application. However, the outer diameter of the fiber will have to be reduced so much that the resulting device will be mechanically weakened. It is therefore desirable that the fiber in its untapered form have a cutoff within ±150 nm of $\lambda_2$. The design of multiclad single mode optical fibers to a desired cutoff is described in M. Monerie, "Propagation in Doubly Clad Single-Mode Fibers", *IEEE J. of Quantum Elec.*, Vol. QE-18, No. 4, p. 535 (April 1982), which is incorporated herein by reference and in S. Kawkami et al, "Characteristics of a Doubly Clad Optical Fiber with a Low-Index Inner Cladding", *IEEE J. of Quantum Electronics*, Vol. QE-10, No. 12, p. 879 (December 1974) which is also incorporated herein by reference.

An alternative method of fabrication which may be more suitable for mass production is to place the fiber in an arc-fusion splicer and to provide an arc while straining the fiber.

The fabrication of the device may be better understood by consideration of the following specific example useful in a WDM system where $\lambda_1$ is 1.3 μm and $\lambda_2$ is 1.55 μm. The starting point was a length of multiclad fiber having a core of silica doped with 10 mole % of Ge and three cladding layers. The first cladding layer was 1.5 mole % fluorine doped silica, the second was 2 mole % of Ge doped silica and the third was undoped silica. The fiber was drawn to a core diameter of 3.9 μm and an outer diameter of 116 μm. The first two cladding layers have thicknesses of 2.7 μm. The device had the refractive index profile shown in FIG. 4. The loss spectrum of the drawn fiber shown in FIG. 5 shows a fundamental mode cutoff with a steep rising loss edge at about 1.522 μm.

A 6 cm length of the fiber was placed on a coupler station and heated with an oxypropane torch. Stretching the length to 6.2 cm produced the transmission spectrum shown in FIG. 6. The device shows approximately zero loss (<0.01 dB) at $\lambda_1$=1.31 μm and a channel dropping capacity of about 16.1 dB at $\lambda_2$=1.526 μm. The 10 dB isolation bandwidth is about 80 nm.

Figure 7:
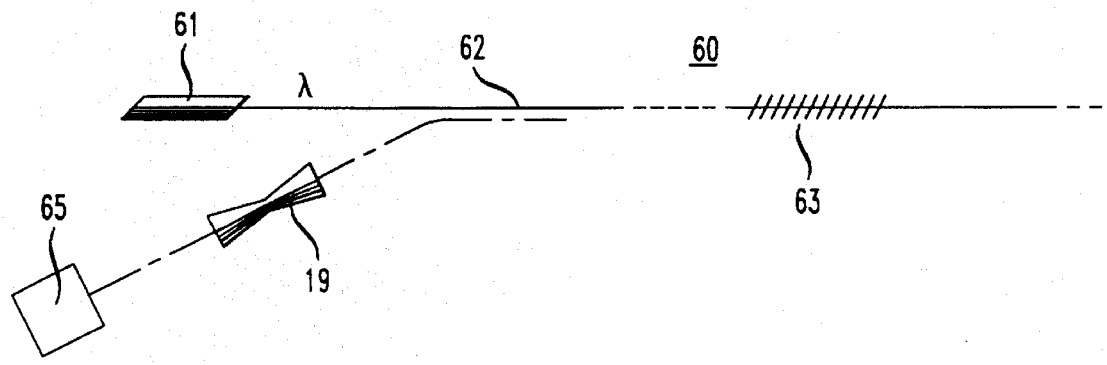
FIG. 7 shows an optical fiber sensing system using a tapered fiber device to provide frequency shift detection.

FIG. 7 schematically illustrates an optical fiber sensing system 60 using a tapered waveguide to provide an inexpensive wavelength shift detector. In essence, the sensing system comprises a source 61 of optical energy around wavelength $\lambda$, a length of optical fiber 62 including a reflective sensing grating 63 for reflecting light of wavelength $\lambda$, a tapered fiber device 19 coupled to fiber 62 for receiving light reflected from grating 63 and a photodetector 65 for detecting the intensity of light through device 19. More specifically, device 19 is tapered to a minimum dimension such that $\lambda$ in the output intensity spectrum is in the region of substantially linear slope near cutoff. In such a region, a shift $\Delta\lambda$, in the reflected wavelength will produce a substantially linear shift in the intensity output of device 19 which can be detected by photodetector 65. The system thus substitutes inexpensive components 19, 65 for the high cost spectrum analyzer of the prior art.

Figure 6:
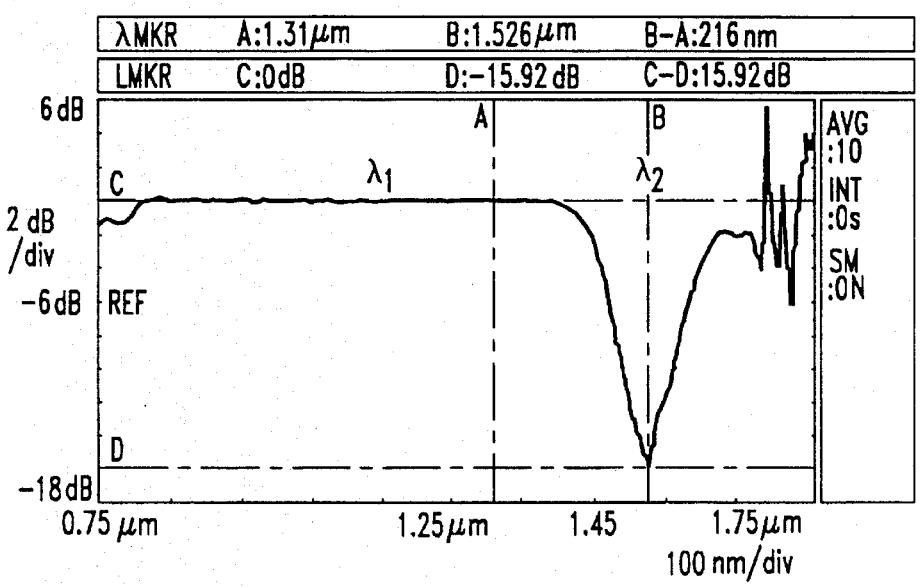

As a specific example, the device 19 whose transmission characteristics are shown in FIG. 6 exhibits a 10 dB drop in power between 1450 nm and 1500 nm. The device thus provides a 0.2 dB/nm slope in that region for providing a useful wavelength shift detector.

The tapered device can also be used as an optical switch for a source capable of transmitting at two wavelengths ($\lambda_1<\lambda_2$). By inserting a tapered device which transmits $\lambda_1$ but cuts off $\lambda_2$, the source is effectively switched off at the output of the tapered device when the source switches to $\lambda_2$. The demultiplexer in FIG. 2 can be viewed as such a switch.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

I claim:

1. An optical filter device for filtering optical signals at a wavelength $\lambda$ comprising:

a length of optical fiber comprising a core and a plurality of cladding layers surrounding said core, said fiber having a fundamental mode cutoff within ±500 nm of $\lambda$; and said fiber containing a single tapered region in the longitudinal direction to selectively attenuate signals at $\lambda$ by at least 3 dB.

2. A device according to claim 1 wherein the length of said optical fiber is less than 1 meter.

3. A device according to claim 1 wherein said cutoff is within ±150 nm of $\lambda$.

4. An optical fiber telecommunications system comprising the device of claim 1 or claim 2 or claim 3.

5. An optical WDM demultiplexer for separating off an optical fiber optical signals at wavelengths $\lambda_1$, $\lambda_2$ ($\lambda_1<\lambda_2$) comprising:

means for coupling said $\lambda_2$ signal off said fiber; and an optical filter device comprising a length multiclad optical fiber, said fiber having a fundamental mode cutoff within ±500 nm of $\lambda_2$ and said fiber containing a single tapered region in the longitudinal direction to selectively attenuate signals at $\lambda_2$ by at least 3 dB, while passing said $\lambda_1$ signal.

6. A device according to claim 5 wherein the length of said multiclad optical fiber is less than 1 meter.

7. A device according to claim 5 wherein said cutoff is within ±150 nm of $\lambda_2$.

8. An optical fiber telecommunications system comprising the demultiplexer of claim 5 or claim 6 or claim 7.

9. In an optical fiber sensing system comprising a source of optical energy around wavelength $\lambda$, a length of optical fiber including at least one reflective sensing grating, and means for detecting shifts in wavelength reflected by said grating, the improvement wherein said means for detecting shifts in wavelength comprises a multiclad optical fiber for receiving light reflected by said grating having a cutoff within ±500 nm of $\lambda$, said fiber containing a single tapered region in the longitudinal direction for producing an output whose intensity varies with shifts in the reflected wavelength, and a photodetector for receiving the output of said multiclad fiber.

10. An optical fiber system comprising:

a switchable source of light for switching between a plurality of wavelengths $\lambda_1, \lambda_2 (\lambda_1 < \lambda_2)$;

disposed in the path of light from said source, a length of multiclad optical fiber, said fiber having a fundamental mode cutoff within ±500 nm of $\lambda_2$, and said fiber containing a single tapered region in the longitudinal direction in order to attenuate light at $\lambda_2$ while passing light at $\lambda_1$.

* * * * *